United States Patent
Chapman, III

(10) Patent No.: US 9,760,720 B2
(45) Date of Patent: Sep. 12, 2017

(54) SECURING TEMPORARY DATA ON UNTRUSTED DEVICES

(71) Applicant: Senteon LLC, Winston-Salem, NC (US)

(72) Inventor: Robert Scott Chapman, III, Lewisville, NC (US)

(73) Assignee: Senteon LLC, Winston-Salem, NC (US)

( * ) Notice: Subject to any disclaimer, the term of this patent is extended or adjusted under 35 U.S.C. 154(b) by 0 days.

(21) Appl. No.: 15/205,377

(22) Filed: Jul. 8, 2016

(65) Prior Publication Data

US 2017/0083710 A1    Mar. 23, 2017

Related U.S. Application Data

(60) Provisional application No. 62/191,131, filed on Jul. 10, 2015.

(51) Int. Cl.
*G06F 21/60*    (2013.01)
*G06F 21/62*    (2013.01)
*G06F 3/06*     (2006.01)

(52) U.S. Cl.
CPC ........... *G06F 21/602* (2013.01); *G06F 3/065* (2013.01); *G06F 3/067* (2013.01); *G06F 3/0619* (2013.01); *G06F 3/0659* (2013.01); *G06F 21/6218* (2013.01)

(58) Field of Classification Search
None
See application file for complete search history.

(56) References Cited

U.S. PATENT DOCUMENTS

| | | | | |
|---|---|---|---|---|
| 6,957,367 B2 * | 10/2005 | Keller | ............ | G06F 11/0793 714/48 |
| 7,945,586 B1 * | 5/2011 | Fang | ............ | G06F 21/6218 707/785 |
| 2004/0088513 A1 * | 5/2004 | Biessener | ............ | G06F 21/85 711/173 |
| 2005/0273600 A1 | 12/2005 | Seeman | | |
| 2007/0162690 A1 * | 7/2007 | Xing | ............ | G06F 11/1435 711/111 |
| 2007/0220068 A1 * | 9/2007 | Thompson | ............ | G06F 17/3023 |

(Continued)

OTHER PUBLICATIONS

PCT/US2016/041464, "International Search Report and Written Opinion", dated Oct. 14, 2016, 12 pages.

*Primary Examiner* — Dede Zecher
*Assistant Examiner* — Richard A McCoy
(74) *Attorney, Agent, or Firm* — Kilpatrick Townsend & Stockton LLP

(57) ABSTRACT

One example method for securing data on untrusted devices includes the steps of intercepting a file command from a software application, the file command comprising a save command or a read command, and indicating a data file; determining whether the data file is a temporary data file; responsive to determining the data file is a temporary data file: if the command is a save command, encrypting data associated with the save command and writing the encrypted data to the temporary data file, if the command is a read command, decrypting data associated with the read command and providing the decrypted data to the software application.

15 Claims, 8 Drawing Sheets

(56) References Cited

U.S. PATENT DOCUMENTS

2010/0257372 A1\* 10/2010 Seifert .................. G06F 21/602
                                                                        713/189
2014/0068256 A1    3/2014 Sima et al.
2016/0196442 A1    7/2016 Chapman \* cited by examiner

SECURING TEMPORARY DATA ON UNTRUSTED DEVICES

CROSS-REFERENCE TO RELATED APPLICATIONS

This application claims priority to U.S. Provisional Patent Application No. 62/191,131, filed Jul. 10, 2015, entitled "Securing Temporary Data on Untrusted Devices," the entirety of which is hereby incorporated by reference herein.

FIELD

The present disclosure generally relates to data security and more specifically relates to securing temporary data on untrusted devices.

BACKGROUND

Portable electronic devices, such as laptops, tablets, and smartphones, are increasingly used in settings in which sensitive information may be stored on the device. For example, a user may send and receive corporate email on their smartphone or may access, edit, and save internal corporate documents on a tablet device, such as via a remote network connection. In addition, it is becoming increasingly common for users to supply their own devices for use at work under policies commonly referred to as "bring your device" or BYOD policies. However, devices used under such BYOD policies present security risks for information technology ("IT") departments, who traditionally provided corporate devices to users with particular security features enabled.

SUMMARY

Various examples are described for securing temporary data on untrusted devices. One example method includes the steps of intercepting a file command from a software application, the file command comprising a save command or a read command, and indicating a data file; determining whether the data file is a temporary data file; responsive to determining the data file is a temporary data file: if the command is a save command, encrypting data associated with the save command and writing the encrypted data to the temporary data file; and if the command is a read command, decrypting data associated with the read command and providing the decrypted data to the software application.

One example system comprises a non-transitory computer-readable medium; a processor in communication with the non-transitory computer readable medium, the processor configured to execute processor-executable instructions stored in the non-transitory computer-readable medium to: intercept a file command from a software application, the file command comprising a save command or a read command, and indicating a data file; determine whether the data file is a temporary data file; responsive to a determination the data file is a temporary data file: if the command is a save command, encrypt data associated with the save command and write the encrypted data to the temporary data file; and if the command is a read command, decrypt data associated with the read command and provide the decrypted data to the software application.

One example non-transitory computer-readable medium comprising processor-executable instructions configured to cause a processor to: intercept a file command from a software application, the file command comprising a save command or a read command, and indicating a data file; determine whether the data file is a temporary data file; responsive to a determination the data file is a temporary data file: if the command is a save command, encrypt data associated with the save command and write the encrypted data to the temporary data file; and if the command is a read command, decrypt data associated with the read command and provide the decrypted data to the software application.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
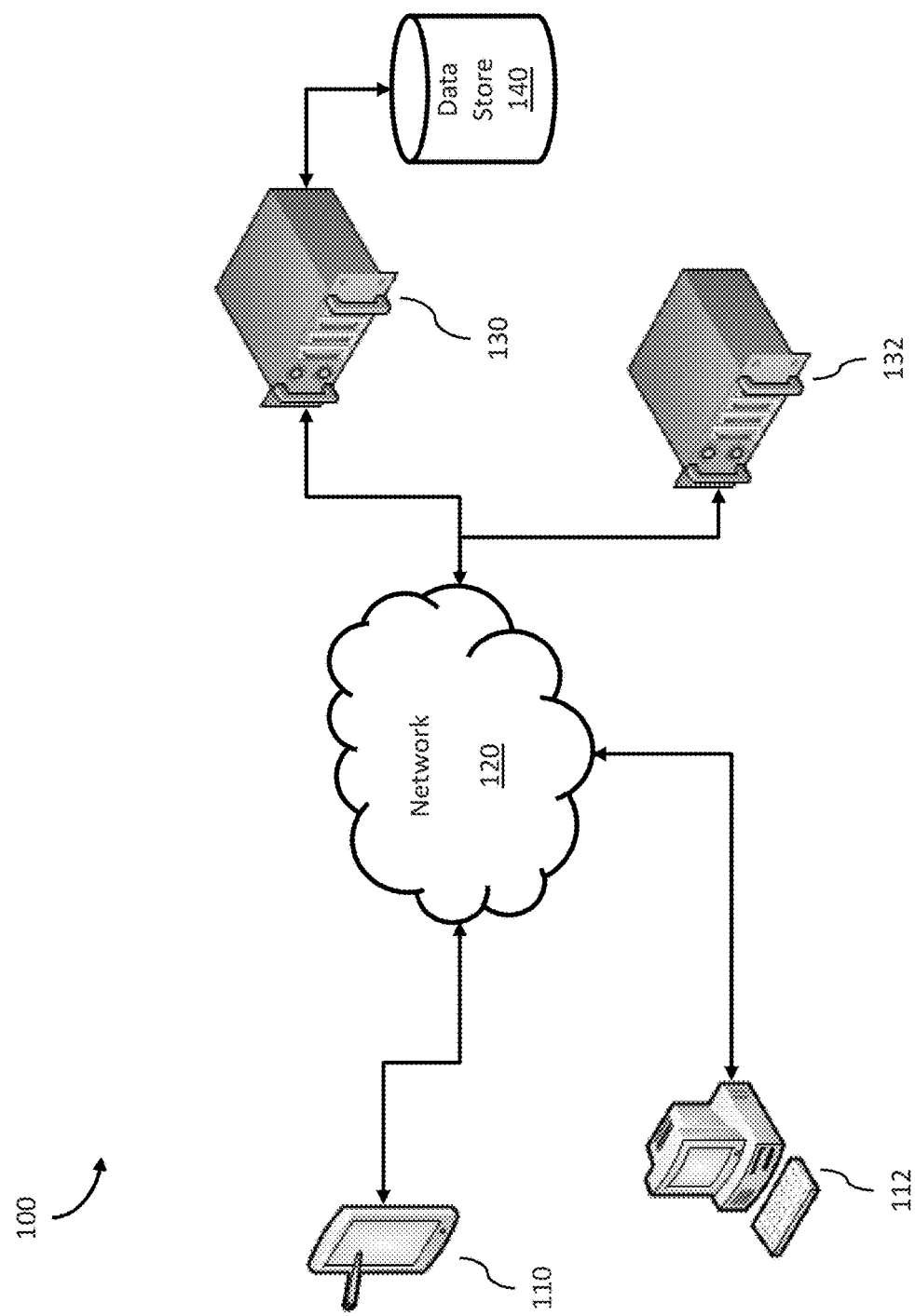
FIG. 1 shows an example system for securing temporary data on untrusted devices.

Examples are described herein in the context of securing temporary data on untrusted devices. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Method for Securing Data on Untrusted Devices

In one illustrative example of a method for securing temporary data on untrusted devices, a user uses a tablet computer to access a word processing document stored on a remote corporate document server. The tablet downloads the document and stores it on a secure partition on a flash memory device within the tablet. The user then executes a word processing application on the tablet, uses a menu to execute a file "open" command, and uses a file navigation dialog window to navigate to the downloaded document within the secure partition. After locating the document, the user clicks an "OK" button to cause the application to open the document.

When the user clicks "OK," the application issues a command to the operating system ("OS") via an application programming interface ("API") that includes a file pathname and filename for the document to be opened. For example, the application executes an operating system API command called OS.FileOpen and provides as a parameter the pathname and filename for the file, such as "z:\secure\docs\businessplan.doc." The API command causes the OS to generate an entry in a command queue to be executed to open the file. In this case, the OS is a multitasking OS and thus receives commands from a wide variety of different threads and processes, including from aspects of the OS itself. Thus, the OS queues received commands within a command queue for later execution. In this case, the OS queues the received file "open" command and the pathname and filename in the command queue for execution.

However, in this example, the user's tablet is executing a software application that monitors commands attempted to be executed on data located within the secure partition. The monitoring software monitors commands within the OS's command queue to identify any commands that include pathnames within the secure partition. In addition, the monitoring software is installed with several dynamic-link libraries (each a "DLL") that are linked to applications that access secure data. These DLLs stand in for certain OS file access commands, including commands for saving data to a file and for reading data from a file. These functions provide certain encryption capabilities discussed in more detail below.

In this example, the monitoring software checks for events within the OS's command queue that have a target pathname that includes "z:\secure." Thus, when the OS generates a new command for the queue for the "open" command with the pathname "z:\secure\docs," the monitoring software identifies the corresponding event and determines whether the corresponding command, "open" in this example, is a permitted command for the software application for this file and for the user for this file. In this example, the user does not have permission to access the file, and so the monitoring software deletes the corresponding event from the command queue before it is executed by the OS. In addition, the monitoring software generates and displays a notification to the user that the attempted command was unauthorized, and generates and stores an entry in the monitoring software's audit log indicating the attempted "open" command, the pathname and filename of the document, the user who attempted to perform the action, and the results of the attempt, which is that the command was not permitted to execute.

The user realizes that she has selected the wrong document, and downloads a second document, "doc2.doc," to the secure partition. The user then attempts to open the second document using the word processing application. The word processing application again calls the OS's API and passes the pathname and filename, "z:\secure\docs\doc2.doc," to the "open" command. The OS generates an entry in its command queue to open the identified file. Again the monitoring software identifies the entry based on the pathname for the secure partition, "z:\secure," and determines whether the software application and the user are permitted to open this document. In this case, the user is authorized to open the file with the word processing application, and so the monitoring software does not delete the entry from the command queue, and thus allows the OS to execute the command. The monitoring software then obtains a process identifier ("process ID") for the instance of the software application that opens the document and stores, in a data structure, a record including the process ID, information about the document (e.g., the filename and path), and a reference to access rules associated with document and the user. In addition, the monitoring software generates an entry in its audit log indicating the successful opening of the file that includes the user's name, the filename, and the command that was executed, "open" in this case. The software application then opens the document and presents it to the user.

The user then decides that she would like to save the document to a removable flash memory device inserted into the tablet, so she selects the command "save as" from the menu system within the word processing application and selects the removable flash memory device as the destination for the "save as" command. The word processing application calls the OS.FileSaveAs API function, which has been overridden by the DLL that has been linked to the word pressing application, and provides the destination pathname and filename for the document, and the OS generates an entry in the command queue for the "save as" command.

In this case, the monitoring software detects the attempted "save as" of the document by identifying the process ID of the instance of the software application in the command queue and analyzing the command corresponding to the process ID. In this case, the monitoring software analyzes the data structure to identify the corresponding access rules for the user and the document. The monitoring software then accesses the access rules to determine whether the user has sufficient permission to perform the "save as" operation to a location outside of the secure location. In this case, the monitoring software determines that the user does not have sufficient permission, and deletes the entry corresponding to the "save as" command from the command queue. As before, the monitoring software generates and displays a notification to the user that the attempted operation is not allowed, and generates an entry in its audit log indicating the attempted command, the pathname and filename, and the user's name.

In this illustrative example, the monitoring software is capable of monitoring for other types of commands as well that might allow either for unauthorized access to a document, or to the unauthorized movement of secured data out of the secured partition. For example the monitoring software is capable of detecting and preventing file-level operations, such as "save," "save as," "copy," "move," "share," and "rename," content-level operations, such as "print," "cut," "copy," "paste," other application-specific operations, such as email operations (e.g., attaching a secure file to an email), as well as other operations that may be executed by other applications or the operating system, such as screenshot or screen recording functionality, or change file permissions to reflect "read only," "read/write," or other types of permissions. Further, because temporary data files may be generated while a document is open and being edited, the monitoring software may protect these files as well.

For example, after the OS has allowed the application to open the document, the user may edit the document. While a user edits a document or file, some software applications, such as Microsoft® Word™, may automatically save temporary data files while the user has a file open for editing. Such temporary files may be used to automatically store changes made by the user in between manual save operations, or to store prior a version of the document to support "undo" operations, to help prevent data loss if the application crashes or the computing system loses power or otherwise stops operating. In this case, after the user opens the document, the word processing application automatically issues a command to the OS to create a temporary file to save user edits and "undo" information as the user works.

To protect potentially sensitive data within these temporary files, the system links a DLL to the software application, which intercepts certain file commands to encrypt or decrypt data within the temporary data files. The DLL is linked such that the application directly calls functions within the DLL rather than OS-level file access functions, which allows the DLL to intercept file commands from the software application, and to encrypt and decrypt data being written to or read from temporary data files. Thus, the system transparently encrypts the data stored in the temporary file so that the word processing application's operation is unaffected, but provides secure storage of such temporary data files.

For example, when data is to be written to a temporary data file, the word processing application calls the OS file write function, which has been overridden by a function having the same name in the DLL. The function in the DLL accesses a memory buffer having the data to be saved and encrypts it. The DLL function then calls the OS file write function, but provides the location of the encrypted data such that only the encrypted data is stored in the temporary data file At a later time, if the temporary data files are read by the software application, the word processing application calls the file read function, which has been overridden by the DLL file read function. The file read function then calls the OS file read function, receives the data from the file read, decrypts it, and provides it to the word processing application. Thus, encryption of data in the temporary data files is performed entirely transparently to the word processing application. No changes are made to the word processing application, other than to dynamically link the DLL with the new versions of the file read and write commands. These new commands manage the process of encrypting and decrypting the temporary data.

The illustrative example above discussed the use of different software applications; however, other portions of this detailed descriptions may reference the general term "process." Software applications may execute as processes on a computing system. For example, when a word processing software application is launched, the executing word processing software application may be referred to as a process. In such an example, for clarity, the processes may be referred to as a "first" process and a "second" process. The labels "first" and "second (and "third," etc.) are not intended to indicate a sequence, but rather simply to distinguish different processes from each other. For example, if multiple different software applications are executing substantially simultaneously on a computing system, such as within the context of a multi-tasking operating system, each software application may be a separate process and may be referred to using such labels. For example, the monitoring software discussed above executes as a process separate and distinct from the word processing software application process, thus the monitoring software may also be referred to as a "first process" and the word processing software application as a "second process." Further, some processes may include one or more execution "threads" that may operate partially or entirely independently of each other. Such threads are typically part of a single process, but may represent different tasks performed by the process. Reference to the terms process and threads throughout may generally refer to these concepts or to concepts generally understood to those of skill in the art. Further, reference to a process may refer to one or more threads that are part of the process. Thus, reference to a process performing some action may refer to such an action being performed by one or more of the process's threads.

Referring now to FIG. 1, FIG. 1 shows an example system 100 for securing temporary data on untrusted devices. The example system 100 includes a portable computing device 110 and a desktop computer 112 in communication with a document server 130 and a management server 132 via a network 120. The document server 130 is in communication with a data store 140 and is configured to maintain files available to the computing device 110 and the desktop computer 112. The management server 132 is configured to establish and provide access policies to the devices 110, 112. The network 120 may be any suitable network, such as the Internet, a cloud-based network, an intranet, local area network, wireless local area network, wide area network, microwave network, satellite network, Integrated Services Digital Network, cellular network, and combinations of these or other types of networks.

Each of the computing device 110 and the desktop computer 112 have installed and execute monitoring software configured to secure data on the respective device 110, 112. The monitoring software communicates with and receives configuration parameters and access credentials for accessing secured data from the server 130. In addition, each of the devices 110, 112 is configured with a storage location that has been established for storing secured data. In this example system 100, each of the devices 110, 112 has a computer-readable medium with a file system partition that has been established to store secure data. The file system partition is configured such that it is separately established in a partition table for the computer-readable medium and may be independently mounted and unmounted from file system. In some examples, the secure partition may reside on a different physical medium.

The server 130 is configured to manage a document repository, such as a corporate document system. The server 130 enables authorized users to log in to the document repository and access one or more documents stored within the document repository. Documents within the document repository are stored in the data store 140 and may be accessed by the server 130 in response to requests received from devices, such as the computing device 110 or the desktop computer 112.

The management server 132 maintains security policy information for authorized users of the document repository. For example, the management server 132 maintains, for each user or for one or more groups of users, configuration settings indicating which files the user may access and which operations the user is permitted to take with respect to each file or group of files. The management server 132 audits security policy information on each device when it attempts to connect to the document repository, and the management server 132 updates the security policy information if needed. In addition, the management server 132 generates security key information for the secure storage location on the devices 110, 112, which will be described in greater detail below.

Figure 2:
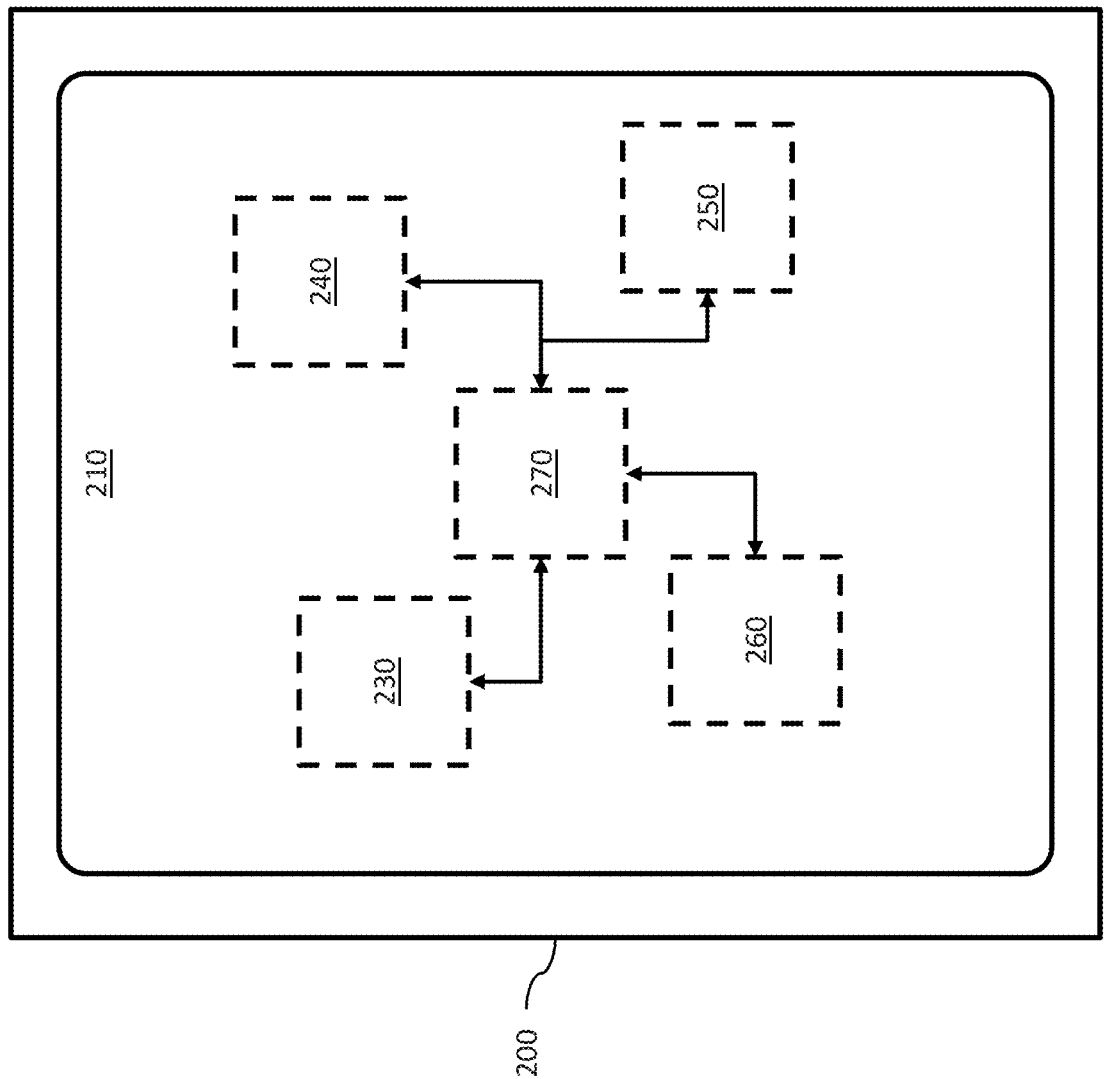
FIG. 2 shows an example computing device for securing temporary data on untrusted devices.

Referring now to FIG. 2, FIG. 2 shows an example computing device 200 for securing temporary data on untrusted devices. The example computing device 200 shown in FIG. 2 is a tablet device, but in some examples, the computing device 200 may be a smartphone, a desktop computer, a laptop computer or other suitable computing device. The example computing device 200 comprises a touch-sensitive display 210, an electronic processor 230, a memory 240, a storage medium 250, a network interface 260, and a communications bus 270. The processor 230 is configured to access the memory 240 and to execute program code stored within the memory 240, and to read and write data to the memory 240. The processor 230 is also configured to access the storage medium 250 to load data into the memory 240, or to store data from memory to the storage medium 250. The processor 230 is further configured to use the network interface 260 to access one or more communications networks, such as the network 120 shown in FIG. 1, and to communicate with other devices connected to the network(s).

The storage medium 250 is configured to maintain one or more file systems and one or more data files. Examples of suitable types of storage media are described in greater detail later in this detailed description. In this example, however, the storage medium 250 comprises a flash memory device that has been configured to have two file system partitions. One partition (the "primary partition") is configured to store the device's 200 operating system and other data files, and the second partition (the "secure partition") is configured to store data files received from a document repository.

In this example, the device 200 initially boots and mounts the primary partition as a part of the operating system's file system. In addition, while the device 200 boots, it executes monitoring software, which will be described in greater detail below. Once the device 200 booted, it operates using the primary partition, which stores the operating system, various software applications, such as word processing, spreadsheet, web browsing, and other applications, and various data files, including user data files. In this example, the monitoring software is configured to mount and unmount the secure partition.

It should be noted that while the term "mount" is used in this example and elsewhere in this detailed description, it is not intended to reference the use of the "mount" utility available within certain operating systems. Instead, the term "mount" and the related term "unmount" are used throughout this specification as generic terms for the process of attaching or detaching a file system. The terms "mount," "attach," "unmount," and "detach," may be used interchangeably to refer to this process.

Figure 3:
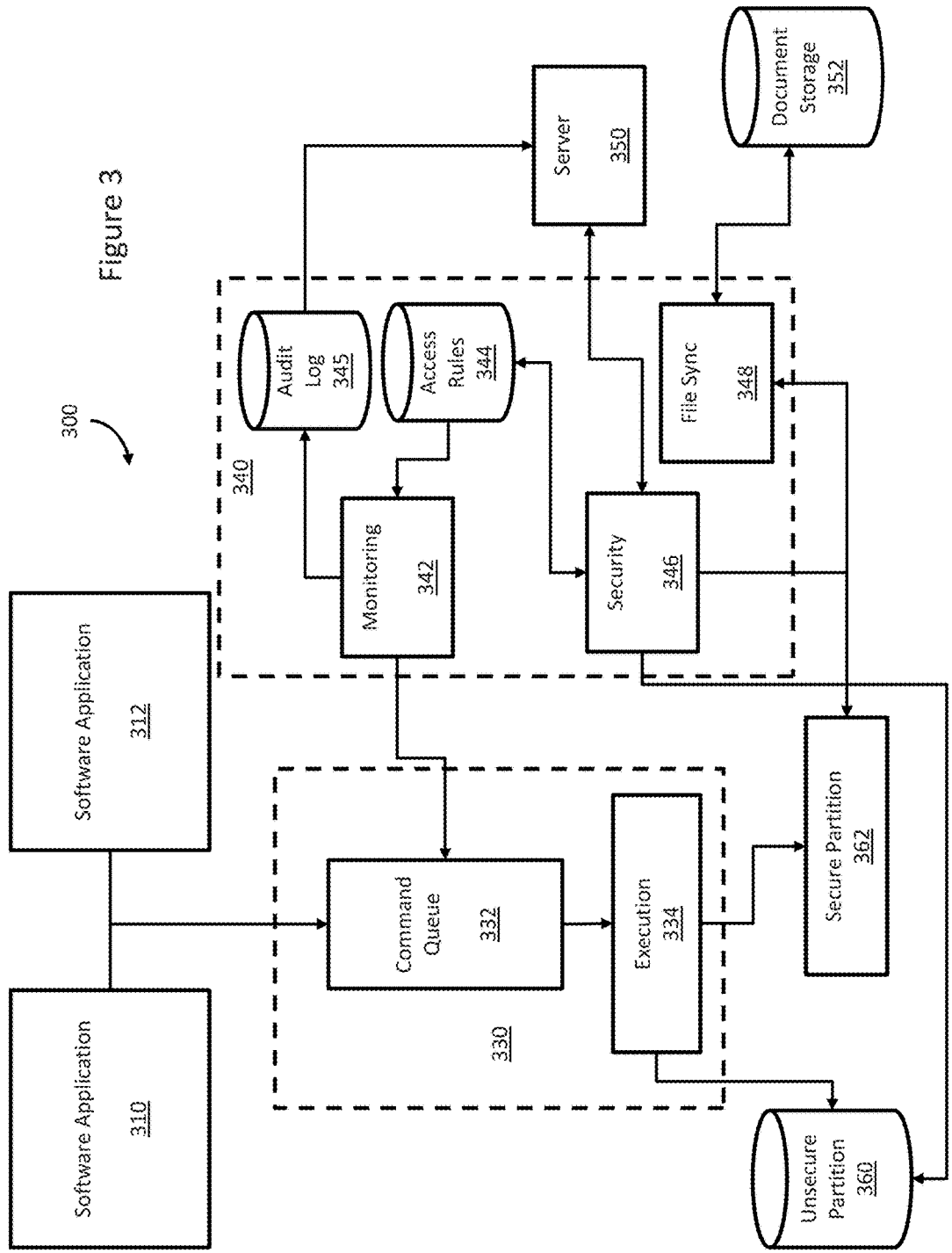
FIG. 3 shows an example system for securing temporary data on untrusted devices.

Referring now to FIG. 3, FIG. 3 shows an example architectural diagram for a system 300 for securing temporary data on untrusted devices. In this example, the diagram represents a configuration of an example computing device, such as the computing device 200 shown in FIG. 2. This example is described with respect to the computing device 200 of FIG. 2, but any suitable computing device may be used. In this example, software applications 310, 312 seek to access and manipulate data files stored on a secure partition 335.

The system 300 includes a subsystem 340 for securing data on untrusted devices executing within a computing device. The system 300 includes the subsystem 340 as well as one or more software applications 310, 312, an operating system 330, an unsecure partition 360, and a secure partition 362. The subsystem 340 includes monitoring software 342, an access rules data store 344, an audit log 345, security software 346, and file sync software 348.

The software applications 310, 312 are configured to be executed by the computing device 200 and to access data files stored on the computing device 200 or any available filesystem. For example, if software application 310 is a word processing application, the software application 310 enables a user to create, modify, and store documents on the computing device. To do so, the software application 310 interacts with the operating system 330, such as to call OS API functions to create, modify, and store data files on a storage medium. When the software application 310 calls an OS API function, the function inserts a command into the OS's command queue 332 for later execution by the operating system, shown as an "execution" block 334 of the operating system. When the execution block 334 executes a command, it may access a storage medium to manipulate a data file, such as to open a file or to save changes to a file.

The subsystem 340 operates alongside the operating system to manage access to data storage and the secure partition 362. In this example, and as discussed above, when the computing device is initially powered on or otherwise is booted, the computing device 200 launches the operating system 330 and also launches the subsystem 340, including the monitoring software 342 and the security software 346. In this example, the security software 346 is configured to create the secure partition 362 if it does not already exist. In one example, the security software 346 will generate a new entry in a partition table for a storage device for the secure partition 362, and generate an encrypted partition.

If the secure partition 362 does already exist, the security software will access and mount the secure partition 362 such that it is accessible to the operating system 330.

While discussions of this example has referenced an operating system, other examples may employ application environments other than operating systems. One example uses an application server environment executing on top of an underlying operating system. In such an example, the monitoring software 342 may instead monitor a command queue for the application server environment rather than the operating system. In some examples, the monitoring software 342 may monitor a command queue for the application server environment and a command queue for the operating system.

Still further layering of execution environments or parallel execution of execution environments are contemplated, such as one or more virtual machines executing on a computing system. In one such example, each virtual machine may execute a different operating system and monitoring software. In some examples, monitoring software 342 may monitor each of the virtual machines interaction with underlying operating system software.

In this example, the secure partition 362 is a dedicated partition established on the storage medium 250 within the computing device 200. The secure partition 362 was initially established on the storage medium using a disk partitioning facility, e.g., "fdisk." In addition, the security system 346 is configured to encrypt the secure partition using key-based encryption, such as the Advanced Encryption Standard ("AES") or Twofish mechanism. In some examples, multiple encryption mechanisms may be employed in a cascade, such as AES, Twofish, and Serpent mechanisms applied in succession to the same data. Thus, when data is stored on the secure partition 362, it is stored in an encrypted format. Later, when a software application requests access to an encrypted file, a decrypted version of the file is provided to the software application.

In this example, the storage medium 250 also comprises a partition for unsecured data storage 360, or an unsecured partition 360. The unsecured partition, as described above, may store OS files, software applications, and other data files. During operation, one or more software applications may generate temporary data files that may be stored on the unsecured partition 360. It should be noted that while the unsecured partition is referred to as "unsecured," that is not intended to imply that no security or access controls to data stored on the unsecured partition. In fact, different types of security services or access controls may be provided on the unsecure partition 360. Instead, the nomenclature is intended to differentiate the unsecure partition 360 from the secure partition 362, which is secured by the subsystem 340 in this example, while only individual temporary data files on the unsecured partition 360 by the subsystem in this example. Note that in other examples, different portions of the unsecured partition 360 may be secured by the subsystem 340, or the unsecure partition 360 may be a second secure partition in some examples. For example, it may be configured as a second secure partition specifically created to enable storage of data files while being edited and corresponding temporary data files according to the same or similar mechanisms and processes described herein with respect to the secure partition 362, or as discussed in more detail below.

In some examples, temporary data files may be stored on the secured partition 362, rather than in the unsecured partition 360. In one such example, the temporary data files are treated as any other data file stored on the secured partition 362 and are subject to the access rules 344. Default access rules may be established for temporary data files to allow writing and reading the data files, but otherwise with access restrictions similar to, or identical to, the access restrictions associated with the source document. For example, if a word processing document has access rules that allows a user to edit a document, but not email the document, a corresponding set of access rules may be created for any temporary data files created based on the document. Thus, the temporary data files may be created and written to, but not emailed.

The security software 346 is configured to regulate access to the encrypted data on the secured partition 360 and to maintain and update rules within the access rules data store 344. In this example, after the device 200 has booted, the user is asked to provide her credentials to the security software 346, such as a user name and password. In some examples, other types of authentication may be used, such as two-factor authentication using a generated access code. After the user has provided acceptable credentials, the security software 346 mounts the secure partition 362 and then attempts to access a remote server 350 to obtain encryption keys to access the data on the secure partition 362. For example, the computing device 200 may be a laptop used by an employee of a company to access files within the company's document repository.

The security software 346 then attempts to access the company's server 350 to obtain an encryption key. In this example, when the security software 346 connects with the company's server 350, the security software 346 provides the user's access credential to the server 350. The server 350 then accesses or generates an encryption key to be used by the security software 346. In one example, the server 350 generates a 504-bit key, hashes the key, and transmits the hashed key to the computing device 200. If the security software 346 is unable to access the server 350, it may determine whether it has an existing, valid encryption key. For example, an encryption key may be usable for a certain time period, such as 48 hours, before expiring, at which time, the encryption key is disabled by the security software 346.

In this example, the security software 346 is configured to maintain encryption keys for up to 48 hours before disabling them. But in addition, the security software is also configured to request a new key from the server 350 every 4 hours. When a new key is obtained, the secure partition is re-encrypted using the new key, which consequently invalidates the old key. In addition to re-starting the 48 period, an effect of using a new key every four hours is that it may help re-secure a device that has had its previous key compromised by an unauthorized entity. But as long as the computing device 200 remains in communication with the server 350, and as long as an authorized user is logged into the security software, it will have indefinite access to data files (authorized to the user) stored in the secure partition 362. However, if the computing device 200 becomes disconnected from the server 350, the user may continue to access the secure partition for up to 48 hours before losing access to the data files. It should be apparent that these time periods are provided by way of example only and different key refresh and key expiration time periods may be established. In some examples, different types of files may have different key refresh or key expiration periods. For example, highly-sensitive documents may have a shorter key expiration period than less-sensitive documents. And in some examples, each document may have its own associated key refresh or expiration time period.

In addition, the security software 346 checks for any updated access rules for the user and, if any are found, it downloads the access rules and stores them in the access rules data store 344. Access rules may include user-specific, device-specific, file-specific, application-specific, or other types of rules that may be defined to regulate access to data files. For example, a user may only have access to certain files available within a company's file repository, thus a set of user rules may include information indicating whether a user has permission to open or otherwise access a data file stored in the secure partition 362. Thus, when a user attempts to open the data file, the monitoring software 342 checks the access rules 344, identifies the rule associated with the user and the data file, and prevents the file "open" command from being executed by deleting the command from the command queue 332. In this example, the monitoring software 342 also adds an entry in the audit log 345 to indicate the command that was disallowed and other relevant information, such as the user who attempted the command, the time and date of the attempt, the file name, or the path. The audit log 345 may be transmitted to the server 350, or may be requested by the server 350. For example, the audit log 345 may be transmitted to the server 350 every day. In some examples, the audit log 345 may be stored at the server 350, and the computing device 200 may transmit audit log messages to the server 350 for entry into the log 345.

In some examples, access rules may be stored as records within a data store. For example, a suitable example record for an access rule may include the following information:

| Field | Value |
|---|---|
| Rule ID | 0x01 |
| Device ID | 123e4567-e89b-12d3-a456-426655440000 |

-continued

| Field | Value |
| --- | --- |
| User ID | company/jsmith |
| Document Name | document.doc |
| Path | /secure/docs |
| Action | Copy - Allowed |

Such an access rule relates to user "jsmith" and the identified file "document.doc" stored within the secure partition ("/secure") in the directory "docs." The rule, in this example, is specific to the "Copy" action, which is allowed for this document and this user. Thus, when the monitoring software 342 detects a "copy" action being attempted by a process ID associated with the "document.doc" file and "jsmith," the system will access the access rules, locate the rule associated with the user, the file, and the action, and determine whether to allow the action according to the rule.

The record above is provided as an illustrative example and is not intended to indicate all variations of such a record (or records) or to be an exhaustive or necessary listing of information to be stored within records according to difference aspects.

One or more records may be obtained from the server 350, or may be created and stored at the computing device 200 based on information obtained from the server 350.

In this example, the subsystem 340 also includes file sync software 348. The file sync software 348 is configured to retrieve one or more data files from, and to push changed or new files to, a document repository (or repositories), shown as document storage 352 in FIG. 3. For example, a company may maintain a corporate document repository that allows users to create new documents and check documents into and out of the repository to edit, print, email, or otherwise use the documents. To enable a user to access documents available in the document repository remotely, the company may provide direct access to the document repository, such as via a virtual private network ("VPN"). However, according to examples of this disclosure, the file sync software 348 may retrieve documents from document storage 352 and store local copies of the documents within the secure partition 362 on the computing device. In addition, the file sync software 348 may push new or modified documents to document storage 352. In some examples, the file sync software 348, or other aspects of the subsystem 340, may also provide check-in/check-out functionality with respect to the document storage 348, which may enable the user to open edit a document without another user simultaneously opening and editing the same document.

The file sync software 348 may obtain one or more sets of documents from document storage 352. The file sync software 348 then analyzes the one or more sets of documents to identify documents that are not present in the secure partition. After identifying any missing documents, the file sync software 348 obtains copies of the missing documents and stores them within the secure partition 362. In some examples, the file sync software 348 also determines whether any documents stored on the secure partition 362 are different than a version stored in document storage 352.

For example, the file sync software 348 may generate and compare hash values of one or more of the documents on the secure partition with a corresponding document in document storage 352. If a hash value for a file on the secure partition differs from the version in document storage 352, the file sync software 348 determines whether to push a copy of the document from the secure partition to document storage 352, or to obtain a copy of the document from document storage 352 and replace the copy on the secure partition 362. To make such a determination, the file sync software 348 may compare the date or time of the most recent modification of the file on the secure partition with the date or time of the most recent modification of the file in document storage 352. The file sync software 348 may then copy the most recently-modified version to the other location (e.g., copy a recently-modified version from the secure partition to document storage). In some examples, as discussed above, the file sync software 348 (or the subsystem 340) may be configured to check-out documents from document storage 352. When the document is later checked in, the file sync software 348 may then copy the version from the secure partition to the document storage 352 to replace the then-existing copy in document storage 352.

In some examples, however, the subsystem 340 may not be able to check-out documents from document storage 352. Thus, it is possible for a user of the computing device 200 to edit a copy of a document on the secure partition 362 simultaneously with another user editing a copy of the same document in document storage. In such a case, the file sync software 348 may determine that the two versions of the document have "forked" and thus, the file sync software 348 may copy the file from the secure partition 362 to the document storage as a new document in document storage 352. "Forking" in this case simply refers to the generation of two (or more) different documents from the same source document. In some examples, the file sync software 348 or the subsystem 340 may store an indicator that the new "forked" document is related to the original document.

As briefly discussed above, while a user is editing a data file stored in the secure partition, the software application may generate one or more temporary data files. To do so, the software application may issue one or more commands to the OS 330 by inserting them into the command queue 332. For example, the software application may issue a "create file" command for a new temporary data file, and, upon successful completion of the "create file" command, a "save" command to save data to the temporary data file. As discussed above, and in more detail below, one or more DLLs may be linked to a software application to provide data encryption for temporary data before calling an OS-level command. The monitoring software 342, as described above, is configured to detect such "create file" commands in the command queue 332 and identify an associated process ID. Upon determining that the process ID is associated with access to data in the secure partition 362, the monitoring software 342 determines whether the command is permitted. In this case, the monitoring software 342 determines that the software application is creating a temporary data file, such as by identifying a ".tmp" or similar extension on a filename associated with the "create file" command, and that the temporary data file is being created on the unsecure partition.

After determining that the "create file" command is permitted and that the file to be created is a temporary data file on the unsecure partition, the monitoring system takes no further action with respect to the command queue 332 and allows the OS to execute the command. However, the monitoring software 342 creates a new data record for the new temporary data file associated with the process ID.

When the software application later saves data to the temporary data file, the application calls the "save" or "save as" function, which has been overridden by a DLL function having the same name. The data provided the DLL function is copied into a buffer, where the DLL function encrypts the data. Various examples may employ different encryption mechanism. In this example, the security software 346 uses the encryption key to employ a cascading encryption mechanism that includes AES, TwoFish, and Serpent mechanisms and uses the XEX (XOR-encrypt-XOR)-based tweaked-codebook mode with ciphertext stealing ("XTS") method. In other examples, the encryption key may be used with other suitable encryption schemes to encrypt the data stored in the buffer. The buffer is then supplied to the OS-level "save" or "save as" function along with the number of bytes to write, and the encrypted data in the buffer is written to the temporary file. In this example, once the OS-level function has successfully written the data to the temporary data file, the data in the buffers is discarded, such as by overwriting the buffer and deallocating the memory, or simply by deallocating the memory.

After data has been stored in a temporary data file, the software application may later issue a "read" command to access data stored in the temporary data file. The DLL "read" command is then called, rather than the OS-level "read" command. The DLL "read" command calls the OS-level "read" command, to read the encrypted data from the temporary data file. The DLL "read" command then decrypts the data before it is provided to the application. In this example, the buffer passed into the DLL "read" function is accessed and its contents decrypted after they are read from the file by the OS-level "read" function, and the decrypted contents are then passed to the application.

It should be noted that in some examples, other configurations of software components may be employed. For example, while FIG. 3 shows separate blocks for the monitoring software 342, security software 346, and file sync software 348 as separate components, such a division is not necessary and different functionality may be combined in many different ways. Further, in some examples fewer than all components described above may be included. Some examples may only provide security for temporary storage while accessing documents stored remotely in a secure environment. For example, a user may access a document stored a secure network location such that access to the document is restricted by external access controls. However, temporary files may be stored locally on the device. In one such example, the system 300 of FIG. 3 may not include either an audit log 345 or access rules 344, file sync software 348, or a secure partition 362. Still other examples may include or exclude certain components shown in FIG. 3.

Figure 4:
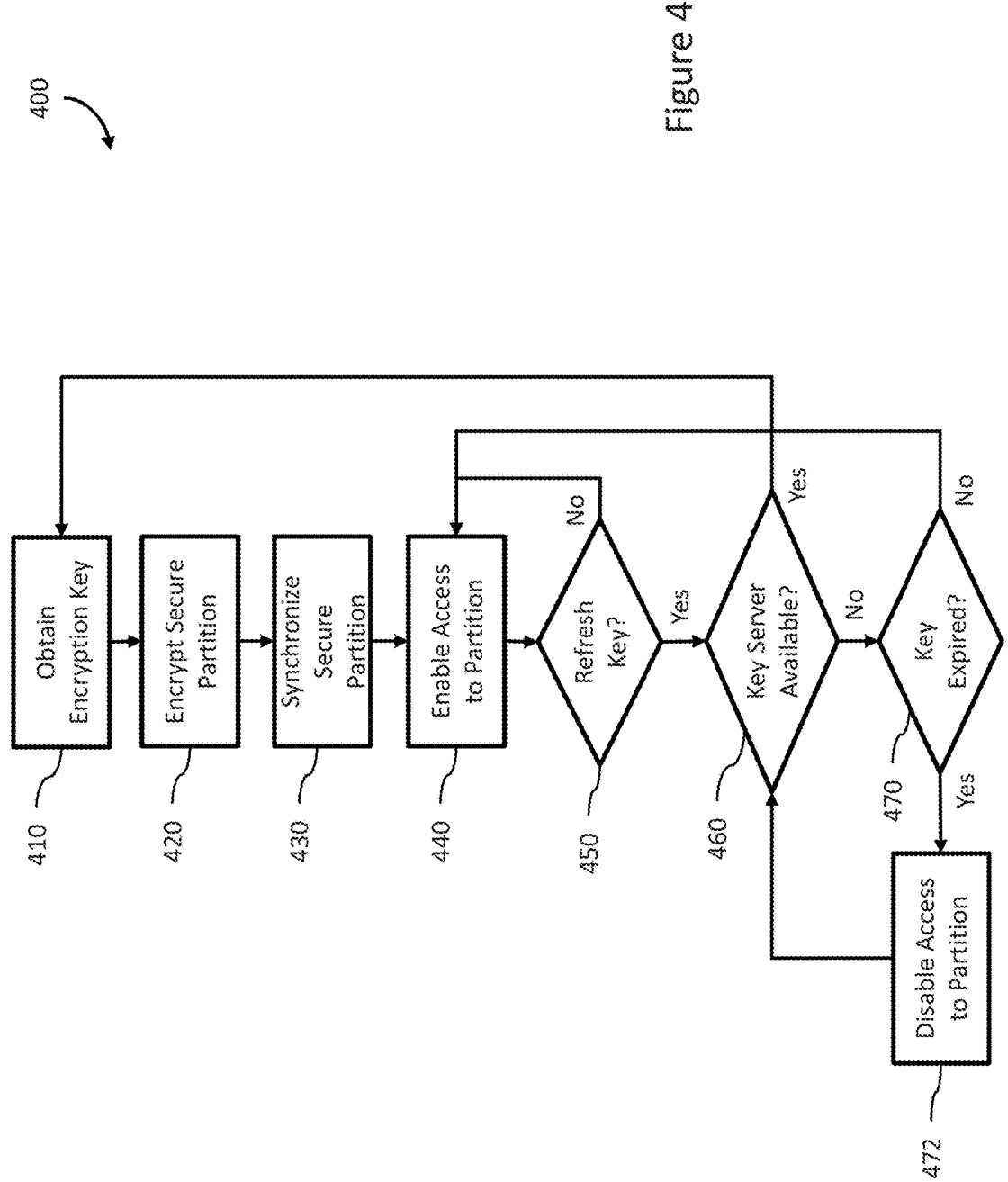
FIG. 4 shows an example method for securing data on untrusted devices.

Referring now to FIG. 4, FIG. 4 shows an example method 400 for securing data on untrusted devices. The method 400 of FIG. 4 will be discussed with respect to the computing device 200 shown in FIG. 2 and the example system 300 shown in FIG. 3. However, example methods are not limited to such a computing device 200 or such an example system 300. Rather, any suitable device or system may be employed. In this example, the method 400 begins at block 410.

At block 410, the security software 346 obtains an encryption key for the secure partition 362. If the secured partition does not exist, the security software 346 creates a new partition on the storage medium 250 to be used as the secure partition 362. In some aspects, to obtain the encryption key, the security software 346 accesses records associated with network addresses of known key servers and transmits a request to one or more of the key servers for an encryption key. In some aspects, the security software 346 may send a "heartbeat" or other message to a server, such as server 350, to indicate that the computing device 200 is operating, rather than a specific request for an encryption key. In response to the request, or in response to receiving a different message or data, from the computing device 200, the key server (or other server) generates and transmits an encryption key to the device. In some aspects, the key server also provides configuration information indicating a time-to-live, or expiration date or time, for the encryption key. In some aspects, the computing device 200 may be preconfigured with time-to-live parameters for use with one or more encryption keys or may obtain time-to-live parameters from a user or an administrator.

In some aspects, files associated with multiple users may have their own encryption key that is associated with each of the users and may be refreshed as described above. For example, the security software 346 may maintain encryption keys for each user, and may also maintain encryption keys for one or more aggregations or groups of users. In some examples, such aggregations or groups may be determined dynamically as multiple users obtain access to the same file or files. When a new aggregation or group is established, such as by determining that two or more users may access the same file, the security software 346 may request an encryption key for the aggregation, and, as will be discussed in greater detail below, may separately maintain one or more timers or expiration times for the new key.

In some aspects, the server 350 encrypts the encryption key using a cryptographic hash function, such as SHA-1, SHA-2, or SHA-3, before transmitting the encryption key to the computing device 200.

After obtaining the encryption key, the method 400 proceeds to block 420.

At block 420, the security software 346 encrypts the secure partition using the obtained encryption key. In this example, the security software 346 uses the encryption key to employ a cascading encryption mechanism that includes AES, TwoFish, and Serpent mechanisms and uses the XEX (XOR-encrypt-XOR)-based tweaked-codebook mode with ciphertext stealing ("XTS") method. In other examples, the encryption key may be used with other suitable encryption schemes to encrypt the secure partition. In some examples, the computing device 200 may employ an OS that supports and is configured to use one or more encrypted file systems, such as Microsoft's Encrypting File System. In addition, if the secure partition has not been mounted, the security software 346 may also mount the secure partition to the computing device's file system, or it may defer mounting until a later time.

In some examples, the security software 346 may generate encrypt different portions of the secured partition 360 using different encryption keys. For example, if multiple different users may access the computing device at different times, the security software 346 may encrypt the active user's files using the encryption key, but may not encrypt the other users' files using that key. Thus, each user may have his or her own encryption key (or keys) that may be active at one time, or that may expire independently of each other, and each user's files may be encrypted using the user's own encryption key.

For example, two users may access the computing device 200. The computing device 200 may assign each user to a different subdirectory structure on the secure partition 362 for the user to access files. When the first user logs into the computing device 200, the computing device 200 obtains an encryption key and encrypts the first user's files using the new encryption key, but does not process other files on the secure partition. As the first user works, the encryption key may be periodically refreshed as described above. Later, when the first user logs off, the security software 346 maintains the user's encryption key until it expires. In the meantime, a second user logs in. The computing device 200 obtains a second encryption key and encrypts the second user's files. Again, as the second user works, the encryption key may be periodically refreshed as described above. Later, the second user logs off, and the first user logs back in. The computing device determines whether the encryption key associated with the first user remains valid. If so, it enables access to the user's files on the secure partition 362. If it is not valid, the security software 346 requests a new encryption key and encrypts the user's files using the new encryption key. Different examples may use such an encryption methodology with one or more users.

After the secure partition has been encrypted, the method proceeds to block 430.

At block 430, the file sync software 348 synchronizes files stored on the secure partition with files stored in document storage 352. In this example, the file sync software 348 maintains records indicating files to synchronize between the secure partition 362 and document storage 352. For example, the file sync software 348 may retrieve a listing from document storage 352 of all documents a user has accessed in document storage 352 in the last 30 days (or other preset or user-configurable time period) and add entries to the list for any new documents created by the user on the computing device 200.

To synchronize one or more files between the secure partition 362 and document storage 352, the file sync software 348 may identify one or more files stored on the secure partition 362 that are not stored in document storage 352 and copy one or more of those files to the document storage 352. The file sync software 348 may also identify one or more files stored in document storage 352 that are not resident within the secure partition 362, and obtain copies of one or more of the files from document storage 352 and save them to the secure partition 362. The file sync software 348 may also analyze versions of files stored in both the secure partition 362 and document storage 352 and determine when a different version of a file is stored in each location. The file sync software 348 may then determine which version is more recent and may attempt to overwrite the older version with the newer version of the file. In some examples, the file sync software 348 may not overwrite an older version of a file with a newer version, but may instead maintain and synchronize both versions. For example, if a user of the computing device 200 edits a document in the secure partition 362, the file sync software 348 may copy the edited document to the document storage 352 and indicate that it is to be stored as a new version of the prior document.

In some examples, the file sync software 348 may be configured to only synchronize a portion of the secure partition, such as a single subdirectory or group of subdirectories. For example, each user that employs the computing device 200 may be allocated and assigned a subdirectory in which their synchronized files will be maintained. Thus, the file sync software 348 may only synchronize files for the user that is logged into the computing device 200. Such a feature may reduce the processing and bandwidth requirements for synchronizing the secure partition 362 with document storage 352.

After synchronization of the secure partition has been initiated, the method 400 proceeds to block 440.

At block 440, the security software 346 enables access to the secure partition 362. For example, the security software 346 may mount the secure partition 362 to enable access. In some aspects, the security software 346 may provide a graphical user interface that provides icons or other graphical elements corresponding to one or more files stored within the secure partition 362. In some aspects, the security software 346 may not need to take any affirmative steps to enable access to the secure partition 362 once it has been mounted.

After the security software 346 has enabled access to the secure partition 362, the method 400 proceeds to block 450.

At block 450, the security software 346 determines whether to refresh one or more encryption keys. In this example, the security software 346 identifies one or more time periods associated with an expiration of an encryption key. For example, an encryption key may have two time periods associated with it, a refresh time period, and an expiration time period. The security software 346 determines a start time for the encryption key, which may be based on the time the key was obtained, the time the key was first used, the time when the secure partition was encrypted, or some other time. The security software 346 then determines an elapsed time and compares the elapsed time to the two time periods. If neither time period has elapsed, no refresh is needed, and the method returns to block 440 and the user may continue to access the secure partition 362. If the refresh time period has elapsed or the expiration time period has elapsed, the method 400 proceeds to block 450, which is described in greater detail below. In some cases, the refresh timer may be exceeded, but the secured device is unable to obtain a new encryption key, thus the security software 346 may also check the expiration time. If the expiration time is met, the method also proceeds to block 450.

In some examples, rather than determining the elapsed time during which a key has been active, the security software 346 may establish one or more expiration times for a key. Thus, the security software 346 can check the current time with the expiration time(s) to determine whether the key has expired or needs to be refreshed. For example, the security software 346 may maintain two expiration times for the key. The first expiration time is a refresh time while the second refresh time is an expiration time. When either time is met or exceeded, the method 400 proceeds to block 460. In some examples, the refresh time may be earlier than the expiration time.

In some examples, the security software 346 may only maintain a single timer for an encryption key, and when the timer has elapsed, or has been met, the method 400 proceeds to block 450. Further, in some examples, the security software 346 may maintain multiple encryption keys, such as described above in the example having two users using the same computing device 200. In some such examples, the security software 346 may maintain separate refresh or expiration times or timers for each encryption key, or may maintain a single time/timer for all encryption keys, or a combination of the two. For example, in one example, the security software 346 may maintain individual refresh times for each encryption key, but may maintain a single expiration timer at which time all encryption keys expire.

As discussed above, multiple users may access a computing device 200. In one such example, the security software 346 maintains different encryption keys for each user. When a first user is logged into the computing device, the security software 346 may only attempt to refresh encryption keys associated with the first user, but the security software 346 may still check to determine whether an encryption key associated with a different user may be expired and thus the method 400 may proceed to block 460, even if the active user's encryption key does not need to be refreshed. In one such example, the encryption key for the inactive user(s) may be used only to encrypt a portion of the secured partition, thus, even if the inactive user(s)'s encryption key(s) expire, the active user's encryption key may remain active and allow the active user to continue to access the secure partition.

If the security software 346 determines that an encryption key is to be refreshed, the method 400 proceeds to block 460, otherwise the method 400 returns to block 440.

At block 460, the security software 346 determines whether a key server is available to obtain a new encryption key. In this example, the security software 346 attempts to communicate with the server 350. If the security software 346 is able to communicate with the server 350, the method 400 returns to block 410 where the security software obtains a new encryption key as described above. If the security software 346 is not able to communicate with the server 350, the security software 346 may attempt to communicate with a suitable alternate or backup server. If the security software 346 is able to communicate with such a suitable alternate or backup server, the method 400 returns to block 410 where the security software 346 obtains a new encryption key as described above. However, if the security software 346 is unable to communicate with a suitable server, the method proceeds to block 470.

At block 470, the security software 346 determines whether the encryption key has expired. In this example, the security software 346 determines whether the expiration period for the encryption key has elapsed. As discussed above, the security software 346 maintains a refresh period and an expiration period for the encryption key. If the expiration period has not elapsed, the method returns to block 440; however, if the expiration period has elapsed, the method proceeds to block 472. In other examples, only one of many encryption keys may expire. For example, if the security software 346 maintains different encryption keys for multiple different users and only refreshes encryption keys for the active user, an encryption key for one user may be refreshed while the encryption keys for other users may expire.

At block 472, the security software 346 disables access to the secure partition 362. In this example, the expiration period indicates that the encryption key has been in use for too long and, because no new encryption key has been obtained, the security software 346 disables access to the secure partition 362. In this example, the security software 346 disables access to the secure partition 362 by disabling access to the encryption key until a new encryption key has been obtained, and by denying all application commands directed to the secure partition, except to close any open files. In some examples, the security software 346 may unmount the secure partition 362 to prevent access to it until a new encryption key has been obtained. Or, in some examples, if multiple users each have different encryption keys, one user's encryption key may expire, while another's remains refreshed. In one such example, the security software 346 disables access to any directories or files in the secure partition 362 associated with the expired key. Or, if a file is associated with multiple users, the security software 346 may allow one user to access the file while preventing access to the file, such as by disabling the user's access rules associated with the file. Access rules will be discussed in greater detail below with respect to FIG. 5.

After access to the secure partition 362 has been disabled, the method returns to block 460 to attempt to communicate with a key server.

While the example method 400 described above has been described as proceeding according to a particular sequence, in some aspects, the sequence of steps may occur in different orders, or multiple steps may occur simultaneously. Thus, no particular ordering of steps should be implied when reviewing FIG. 4 or the corresponding description of the example method 400 shown in FIG. 4.

Figure 5:
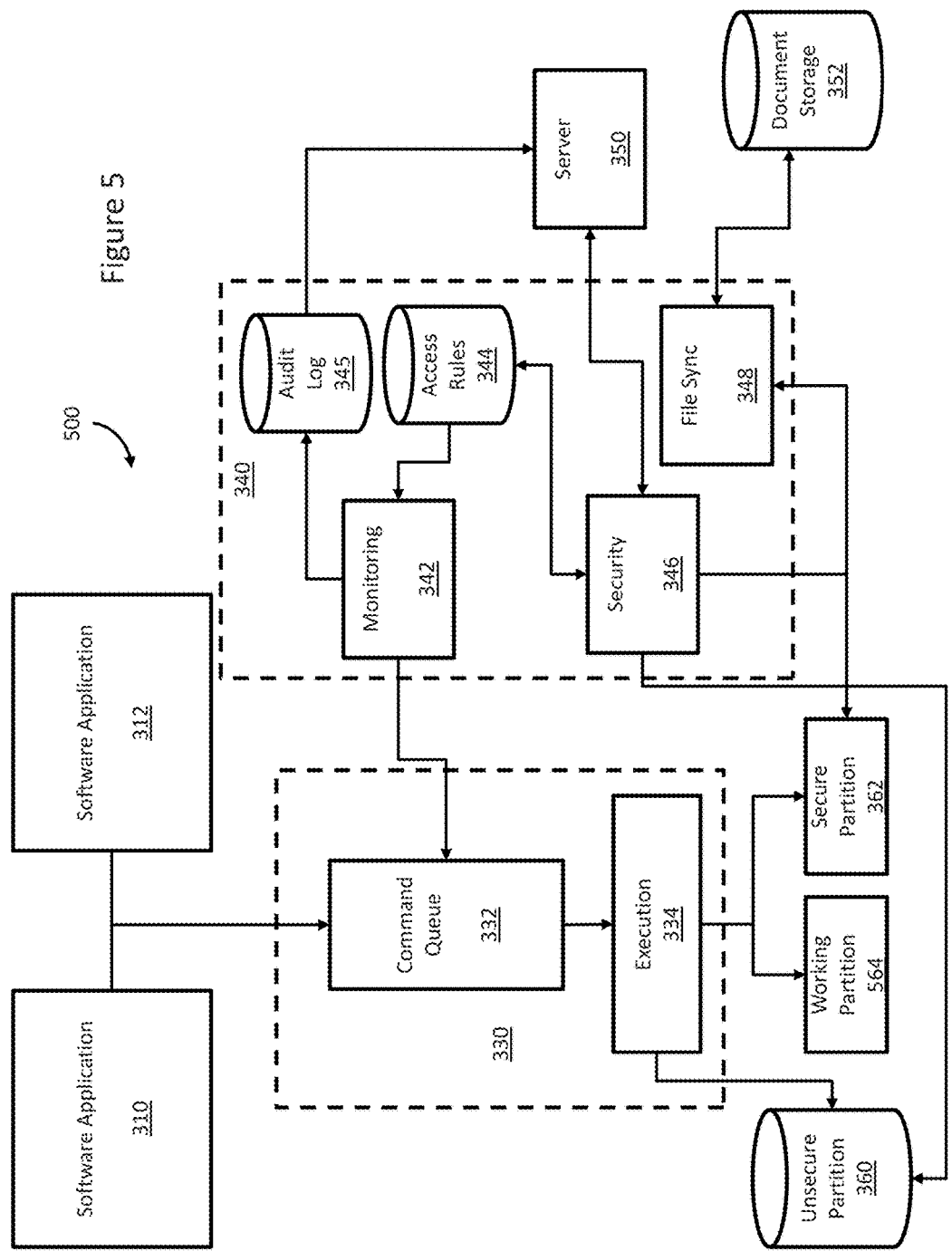
FIG. 5 shows an example system for securing temporary data on untrusted devices.

Referring now to FIG. 5, FIG. 5 shows an example system 500 for securing temporary data on untrusted devices. The system 500 shown in FIG. 7 includes the components of the system 300 shown in FIG. 3, however, it also includes a working partition 564. As discussed above, examples according to this disclosure may employ additional secure partitions, such as for use with temporary files. In this example, the working partition 564 is used to store documents from the secure partition 362 that have been opened for editing. The working partition 564 may be physically maintained on the same computer-readable media as, or a different computer-readable medium from, the secure partition 362, the unsecure partition 360, or both. In this example, the working partition 564 is maintained on the same computer-readable medium as the secure partition 362, but is maintained as a "hidden" partition. A hidden partition is one that is not visible upon casual inspection of the file system. For example, a user examining a list of partitions in a GUI may not be able to view the working partition 564 without taking additional actions, such as explicitly entering the partition name. In some examples, the hidden partition may only be accessible by processes having certain access privileges, e.g., processes executing with "root" or "administrator" privileges, but may not be visible or accessible by processes with fewer privileges. Thus, while in this example, the monitoring software 342 executes as root and is able to read and write data files, such as temporary files, to and from the working partition 564, a user process may not be able to access the working partition 564, absent mediated access via, e.g., the monitoring software 342.

For example, if a user accesses a document stored on the secure partition 362, the monitoring software 342 may detect the a file "open" command for a document in the command queue and determine whether the user is authorized to open the document as discussed above. However, in this example, the monitoring software 342 may copy the file from the secure partition 362 to the working partition 564 and modify the "open" command in the command queue such that it opens the copy of the document on the working partition 564 rather than the copy stored in the secure partition 362. In addition, the monitoring software 342 may link a DLL to the software application to provide new file read and write functions. The monitoring software 342 may further cause the process that opened the file to change the location where it stores temporary files to be in the working partition 564. For example, the monitoring software 342 may change an environment variable of the process for "temp" files to be a location on the working partition 564. Thus, when, during the editing process, the process creates and saves a temporary file, the temporary file is saved to the working partition 564. Later, when the user closes the file in the software application, the temporary files may be deleted, and the monitoring software may, after the underlying file is closed, copy the edited file in the working partition 564 to overwrite the copy of the file on the secure partition 362, resulting in the edited file residing on the secure partition 362, and finally, deleting the copy of the underlying file on the working partition 564.

Figure 6:
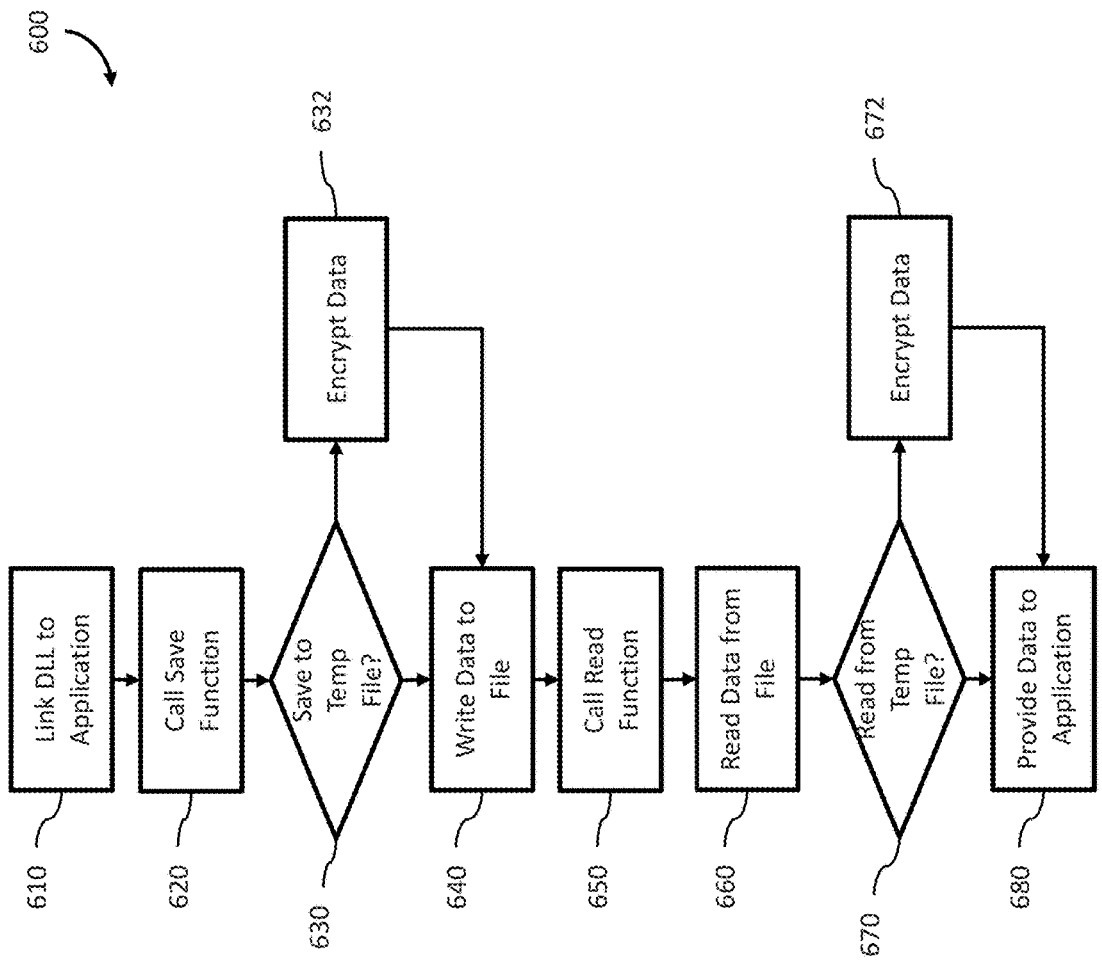
FIG. 6 shows an example method for securing data on untrusted devices.

Referring now to FIG. 6, FIG. 6 shows an example method 600 for securing temporary data on untrusted devices. The method 600 of FIG. 6 will be discussed with respect to the computing device 200 shown in FIG. 2 and the example system 500 shown in FIG. 5. However, example methods are not limited to such a computing device 200 or such an example system 500. Rather, any suitable device or system may be employed. In this example, the method 600 begins at block 610.

At block 610, at least one DLL is linked to a software application. In this example, the DLL includes functions to override OS-level file read and write functions, such as "new file," "save," "save as," and "read" functions, and have the same names and parameter lists as the corresponding OS-level API functions, and are linked in the application in place of the OS-level API functions. However, in other examples, the names of the DLL functions may differ from those in the OS-level API, but remain dynamically linkable to the appropriate locations within the software application. The DLL functions are also linked to the corresponding OS-level API functions as the DLL functions serve as an intermediate layer between the application and the OS-level API functions. Further, in some examples multiple DLLs may be employed, e.g., one DLL may be linked having one or more file write functions, while another DLL may be linked having one or more file read functions. Still further examples may be employed.

Figure 7:
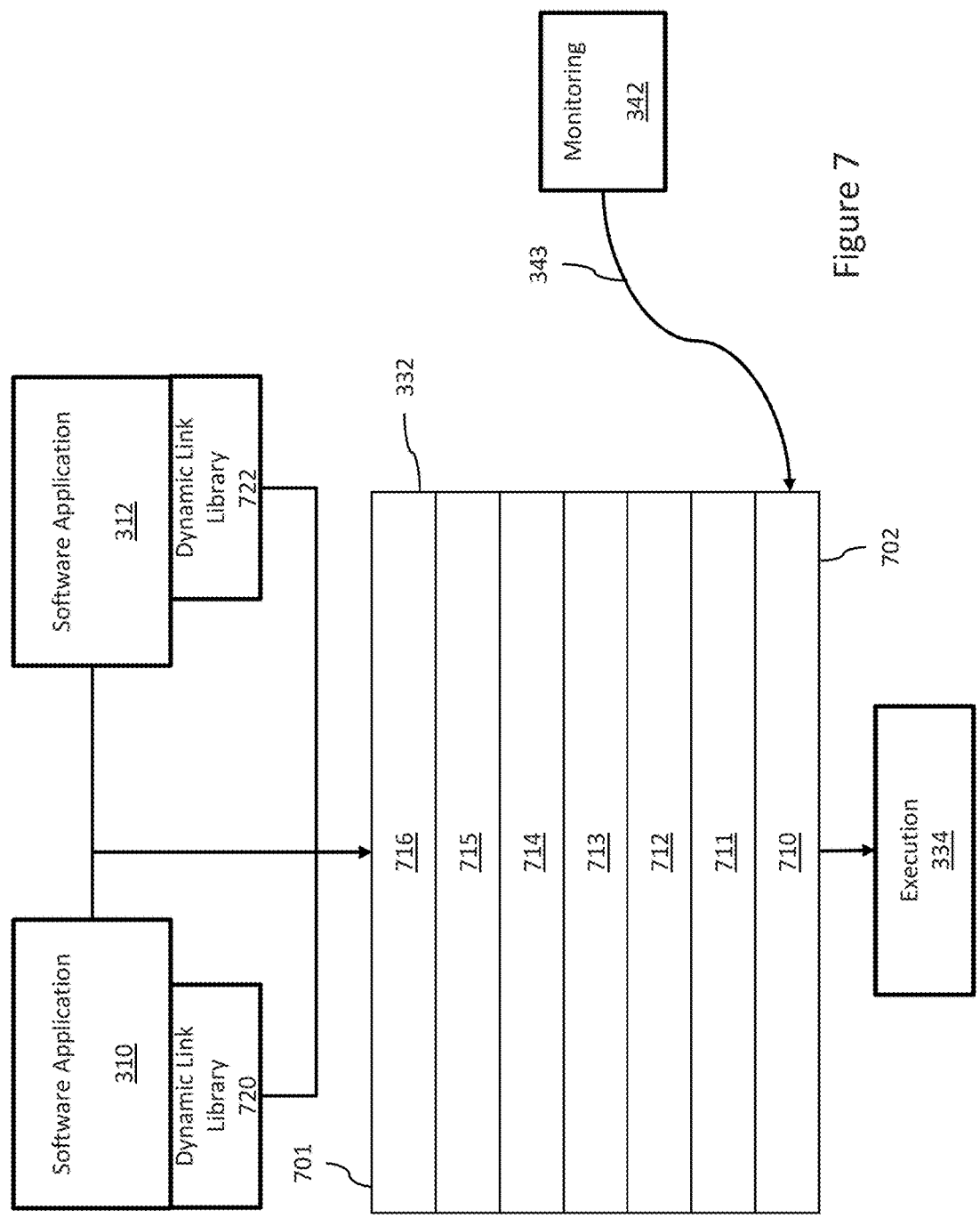
FIG. 7 shows an example system for securing temporary data on untrusted devices.

Referring now to FIG. 7, which shows an example system for securing data in untrusted devices. As may be seen, multiple applications 310, 312 are shown as executing within the computing environment. Each of these software applications has had a DLL linked to it to provide overriding functions for file read and write functionality. The DLLs may be linked at any time, such as when the application is launched, or by the monitoring software 342 when a secure data file is opened. These DLL functions have been written such that they have the same names and parameter list as the standard OS file read and write functions. Thus, when the DLL is linked to the software application, the linking replaces the linking from the software application to the OS functions with a linking from the software application to the DLL functions, which are in turn linked to the OS functions.

Figure 8:
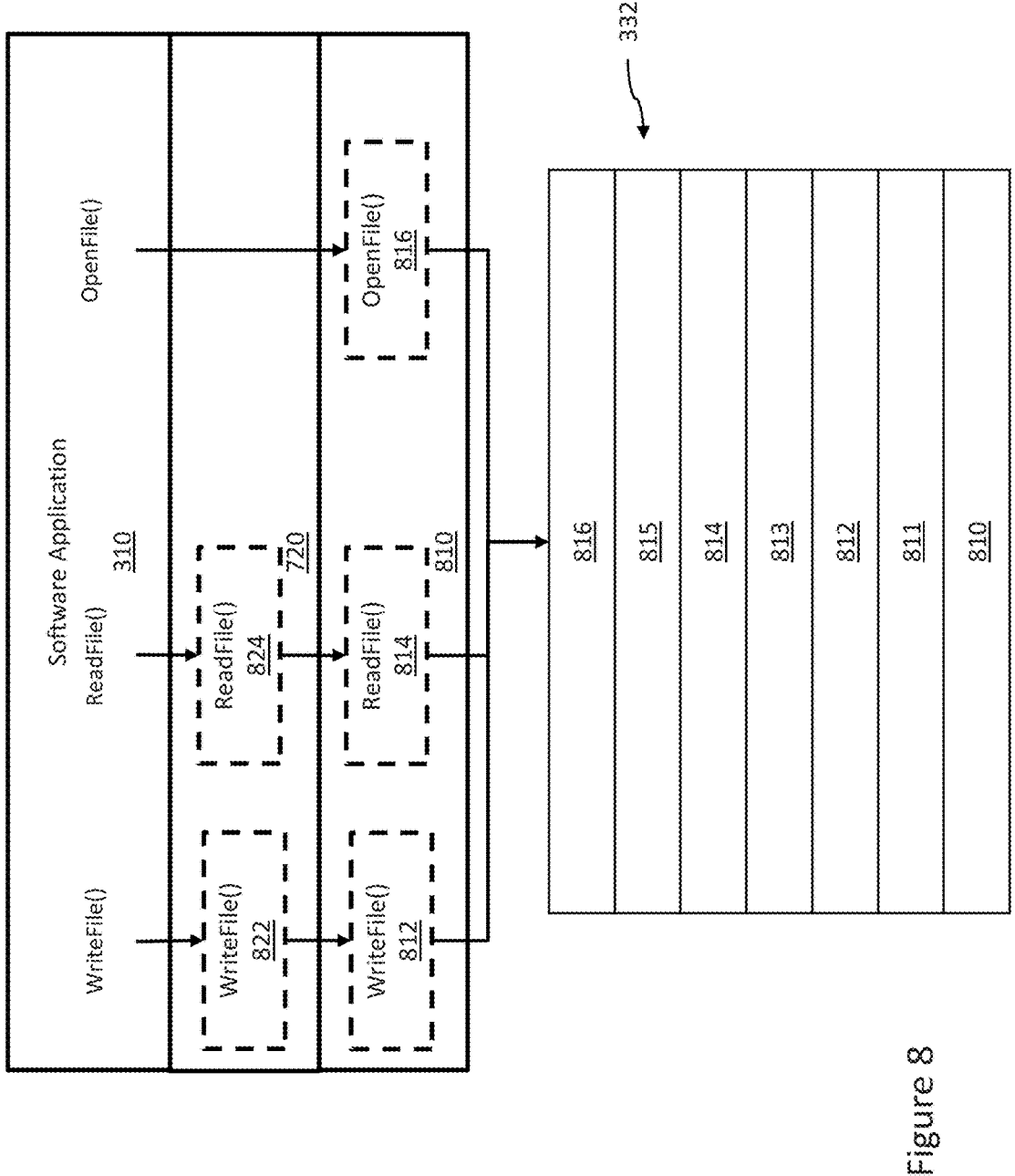
FIG. 8 illustrates insertion of a DLL between a software application and an OS.

FIG. 8 illustrates the insertion of the DLL 720 between the software application 310 and the OS 810 for certain functions. As can be seen, function calls made in the software application 310 for WriteFile( ) and ReadFile( ) are directed to the DLL's WriteFile( ) 822 and ReadFile( ) 824 functions. These DLL functions then in turn call the underlying OS WriteFile( ) 812 or ReadFile( ) 814 functions, which commands are then output to the command queue 332. However, the DLL does not include a function corresponding to the OS's OpenFile( ) 816 function, thus, calls to that function made by the software application directly call the OS OpenFile( ) 816 function. As these function calls are made, they are inserted into the command queue 332 normally. The monitoring software 342 may then determine whether individual commands are allowed, as will be discussed in more detail below.

The file write and read functions 822, 824 provided by the DLL are configured to encrypt data written to temporary data files and decrypt data read from temporary data files, respectively, but not to encrypt or decrypt data saved to the underlying data file being modified by the software application in this example. However, in some examples, encryption and decryption may be performed on the underlying file as well. To determine whether a data file is a temporary data file or an underlying data file, the DLL functions may examine a file extension. For example, a file extension of ".doc," ".docx," ".xls," ".odt," ".pdf," etc. may indicate an underlying data file being edited, while a file extension of ".temp" or ".tmp" may indicate a temporary data file. However, in some examples, the filename of the underlying data file being edited may be provided to, or accessed by, the respective DLL functions. Thus, if a DLL "save" or "read" function is called with a filename other than the filename of the underlying data file being edited, the DLL function may determine that the file is a temporary data file.

In this example, the DLL provides one or more WriteFile( ) functions that override functions of the same name provided by the OS. The WriteFile( ) functions accept certain parameters, such as a filename, a buffer in which data to be written to the file is stored, and a size of the buffer. The WriteFile( ) functions first determine whether the filename is the filename for a temporary data file. When the DLL is linked and initialized, it may be provided with a name of the underlying file being edited or it may analyze file names as function calls are made. Thus, in some examples, the WriteFile( ) function may attempt to match the filename parameter with the name of the underlying file. If a match is found, the DLL WriteFile( ) function then calls the OS WriteFile( ) function using the parameters provided by the software application. However, if the filename does not match the name of the underlying file, the WriteFile( ) function encrypts the data stored in the data buffer.

Various examples may employ different encryption mechanism. In this example, the security software 346 uses the encryption key to employ a cascading encryption mechanism that includes AES, TwoFish, and Serpent mechanisms and uses the XEX (XOR-encrypt-XOR)-based tweaked-codebook mode with ciphertext stealing ("XTS") method. In other examples, the encryption key may be used with other suitable encryption schemes to encrypt the data stored in the buffer. The buffer is then supplied to the WriteFile function along with the number of bytes to write, and the encrypted data in the buffer is written to the temporary file, rather than the original unencrypted buffer. In this example, once the WriteFile function has successfully written the data to the temporary data file, the data in the buffers is discarded, such as by overwriting the buffer and deallocating the memory, or simply by deallocating the memory. It may do this in-place or it may create a new buffer, copy the data from the buffer to the new buffer, and encrypt the data in the new buffer.

After encrypting the data, the WriteFile( ) function provides the filename, the encrypted buffer, and the length of the encrypted buffer to the OS's WriteFile( ) function. Thus, the DLL WriteFile( ) function transparently encrypts data written to temporary data files by the software application.

Similarly, when the software application attempts to read data from a temporary data file, it makes a function call to the DLL's ReadFile( ) function and provides a filename, a buffer, and a buffer size to the ReadFile( ) function. The DLL's ReadFile( ) function then calls the OS's ReadFile( ) function and provides the parameters received from the software application. When the OS's ReadFile( ) function completes, the DLL's ReadFile( ) function determines whether filename is the filename of the underlying file being edited. If so, it returns the buffer from the OS's ReadFile( ) function call to the software application without performing a decryption operation. This is because the underlying data file being edited is not encrypted in this example. If the filename does not match, however, the DLL's ReadFile( ) function decrypts the data in the buffer received from the OS's ReadFile( ) function. As with the WriteFile( ) function, the ReadFile( ) function may decrypt the buffer in-place, or it may create a new buffer and store the decrypted data in the new buffer. The DLL's ReadFile( ) function then provides the buffer having the decrypted data to the software application.

Thus, the DLL is able to provide transparent encryption of data stored in temporary data files. Further, it may do so without encrypting the data stored in the underlying file being edited by the software application. However, the DLL functions are scrutinized like any other commands in the command queue according to this disclosure.

Referring again to FIG. 6, after the DLL is linked to the application, the method 600 proceeds to block 620.

At block 620, the application receives a command to save data to a data file. For example, the application may determine that a predetermined time period has elapsed, or that an period of inactivity has elapsed, and data should be saved to a temporary data file, or the application may receive an explicit save command from a user input, e.g., based on a key combination or a menu selection of a "save" command. In different examples, a variety of different events may cause a command to save data to a data file may occur, any of which may be suitable for the example method 600 of FIG. 6.

After the application receives the save command, it makes a call to a "save" function. Example "save" functions include "save" or "save as," though others may be employed as well, e.g., "create" a new file. In this example, the DLL linked to the application overrides the default links to the OS-level file save commands in the OS-level API. Thus, the application calls a "save" function within the DLL.

At block 630, the save call is intercepted by the DLL save function, which has been linked in place of the corresponding OS-level API function. The DLL save function then determines whether the file to which the data is to be saved is the data file being edited or a temporary data file. For example, as discussed above, the save function may determine that the data file is a temporary data file based on a comparison between a filename extension and a listing of known extensions for temporary data files. In some examples, the DLL may determine a filename of the underlying data file being edited, e.g., based on a first intercepted read function associated with a file "open" command. The save function may then compare the name of the file to which data is to be written with the name of the underlying data file.

If the save function call indicates that data is to be written to a temporary data file, the method 600 proceeds to block 632. Otherwise, the method 600 proceeds to block 640.

At block 632, the DLL save function called by the application encrypts the data to be written to the data file. For example, the DLL save function may employ one or more of the encryption techniques discussed above to encrypt the data. After the data has been encrypted, the DLL save function calls the corresponding OS-level save function and provides the encrypted data. The method 600 then proceeds to block 640.

At block 640, the OS-level save function is called by the DLL and a save command is entered into the command queue 332 as described above. In some examples, the system 500 may employ monitoring software 342, which may analyze the save command as discussed above with respect to FIG. 4. If the command is permitted to be executed, the data is written to the specified data file.

At block 650, the software application makes a function call to a file read function. In this example, the DLL linked to the application overrides the default links to the OS-level file read commands in the OS-level API. Thus, the application calls a file read function within the DLL. Such read functions may include a file "open" command in some examples.

At block 660, as with the save operation discussed above, the read call is intercepted by the DLL read function linked in place of the corresponding OS-level API function. The DLL file read function then calls the underlying OS-level file read API function, and a read command is created in the command queue 332 as described above. As discussed above with respect to block 640, the system 500 may employ monitoring software 342, which may analyze the file read command as discussed above with respect to FIG. 4. If the command is permitted to be executed, the data is read from the specified data file.

At block 670, the DLL read function receives the data from the OS-level file read function, and determines whether the data file is a temporary data file as discussed above with respect to 630. If the data file is a temporary data file, the method 600 proceeds to block 672. Otherwise, the method 600 proceeds to block 680.

At block 672, the DLL file read function decrypts the data received from the OS-level file read function.

At block 680, the DLL file read function provides the data to the application.

While the discussion of the method 600 of FIG. 6 was described as a sequence of a file write followed by a file read, it should be appreciated that the method may terminate after block 640, without a corresponding read command being executed. Further, it should be appreciated that in some examples, the method may proceed directly from block 610 to block 650 without an intervening file save command. For example, if the software application were to crash, upon restarting the software application, the software application may attempt to access one or more temporary data files to restore a user's prior work. Further, the file save and file read blocks may be performed entirely independently of each other and need not have a one-to-one, or even any, correspondence.

Further, as referenced above with respect to blocks 640 and 660, in some examples, the method 600 of FIG. 6 may be performed in parallel with, or in conjunction with, the example method 400 of FIG. 4. The example method 400 of FIG. 4, as described above, may provide access to a secure partition 360 or the working partition 564, while the method 600 of FIG. 6 may regulate commands executed on different files within the secure partition 360 or to another partition, such as the working partition 564. However, the example method 600 of FIG. 6 may be performed independently of FIG. 4, and performance of the example method 400 of FIG. 4 is not required. Further, the example method 400 of FIG. 4 may be performed without performing the example method of FIG. 6. However, performing both methods 400, 600 may provide enhanced benefits for securing data on untrusted devices While the methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   intercepting a first command to open a data file from a software application;
   prior to opening the data file, copying the data file to a first partition;
   opening the copied data file on the first partition by the software application and not opening the data file;
   after opening the copied data file, intercepting a file command from the software application, the file command comprising a save command or a read command, and indicating a temporary data file, the temporary data file associated with the copied data file;
   determining whether the file command is directed to the temporary data file;
   responsive to determining the file command is directed to the temporary data file:
   if the file command is a save command, encrypting data associated with the save command and writing the encrypted data to the temporary data file, and
   if the file command is a read command, decrypting data associated with the read command and providing the decrypted data to the software application; and
   in response to intercepting a command to close the copied data file from the software application:
   closing the copied data file;
   replacing the data file with the copied data file; and
   deleting the copied data file on the first partition and the temporary data file.

2. The method of claim 1, further comprising linking a dynamically-linked library ("DLL") to the software application, the DLL comprising at least one of a file save function or a file read function.

3. The method of claim 1, wherein linking the DLL to the software application comprises replacing at least one link to an operating system ("OS") file save function with a DLL file save function or an OS file read function with a DLL file read function.

4. The method of claim 1, wherein the writing the encrypted data to the temporary data file comprises writing the temporary data file on a secure partition.

5. The method of claim 1, wherein writing the encrypted data to the temporary data file comprises writing the encrypted data to the temporary data file on the first partition.

6. A system comprising:
   a non-transitory computer-readable medium;
   a processor in communication with the non-transitory computer readable medium, the processor configured to execute processor-executable instructions stored in the non-transitory computer-readable medium to:
   intercept a first command to open a data file from a software application;
   prior to opening the data file, copy the data file to a first partition;
   open the copied data file on the first partition by the software application and not open the data file;
   after opening the copied data file, intercept a file command from the a software application, the file command comprising a save command or a read command, and indicating a temporary data file, the temporary data file associated with the copied data file;
   determine whether the file command is directed to the temporary data file is a temporary data file;
   responsive to a determination the file command is directed to the data file is a temporary data file:
   if the file command is a save command, encrypt data associated with the save command and write the encrypted data to the temporary data file; and
   if the file command is a read command, decrypt data associated with the read command and provide the decrypted data to the software application; and
   in response to intercepting a command to close the copied data file from the software application:
   close the copied data file;
   replace the data file with the copied data file; and
   delete the copied data file on the first partition and the temporary data file.

7. The system of claim 6, wherein the processor is further configured to link a dynamically-linked library ("DLL") to the software application, the DLL comprising at least one of a file save function or a file read function.

8. The system of claim 6, wherein the processor is further configured to replace at least one link to an operating system ("OS") file save function with a DLL file save function or an OS file read function with a DLL file read function to link the DLL to the software application.

9. The system of claim 6, wherein the processor is further configured to write the temporary data file on a secure partition to write the encrypted data to the temporary data file comprises.

10. The system of claim 6, wherein the processor is further configured to write the encrypted data to the temporary data file on the first partition.

11. A non-transitory computer-readable medium comprising processor-executable instructions configured to cause a processor to:
   intercept a first command to open a data file from a software application;
   prior to opening the data file, copy the data file to a first partition;
   open the copied data file on the first partition by the software application and not open the data file;
   after opening the copied data file, intercept a file command from the software application, the file command comprising a save command or a read command, and indicating a temporary data file, the temporary data file associated with the copied data file;
   determine whether the file command is directed to the temporary data file;
   responsive to a determination the file command is directed to the temporary data file:
     if the file command is a save command, encrypt data associated with the save command and write the encrypted data to the temporary data file; and
     if the file command is a read command, decrypt data associated with the read command and provide the decrypted data to the software application; and
   in response to intercepting a command to close the copied data file from the software application:
     close the copied data file;
     replace the data file with the copied data file; and
     delete the copied data file on the first partition and the temporary data file.

12. The non-transitory computer-readable medium of claim 11, wherein the processor-executable instructions are further configured to cause a processor to link a dynamically-linked library ("DLL") to the software application, the DLL comprising at least one of a file save function or a file read function.

13. The non-transitory computer-readable medium of claim 11, wherein the processor-executable instructions are further configured to cause a processor to replace at least one link to an operating system ("OS") file save function with a DLL file save function or an OS file read function with a DLL file read function to link the DLL to the software application.

14. The non-transitory computer-readable medium of claim 11, wherein the processor-executable instructions are further configured to cause a processor to write the temporary data file on a secure partition to write the encrypted data to the temporary data file comprises.

15. The non-transitory computer-readable medium of claim 11, wherein the processor-executable instructions are further configured to cause a processor to write the encrypted data to the temporary data file on the first partition.

\* \* \* \* \*